(12) United States Patent
Martin et al.

(10) Patent No.: US 12,582,023 B2
(45) Date of Patent: Mar. 24, 2026

(54) AGRICULTURAL DEVICE

(71) Applicants: Charles H. Martin, Loysville, PA (US); Dominic R. Martin, Loysville, PA (US)

(72) Inventors: Charles H. Martin, Loysville, PA (US); Dominic R. Martin, Loysville, PA (US)

( * ) Notice: Subject to any disclaimer, the term of this patent is extended or adjusted under 35 U.S.C. 154(b) by 585 days.

(21) Appl. No.: 18/064,527

(22) Filed: Dec. 12, 2022

(65) Prior Publication Data

US 2024/0188479 A1 Jun. 13, 2024

(51) Int. Cl.

| | |
|---|---|
| *A01B 63/00* | (2006.01) |
| *A01B 63/32* | (2006.01) |
| *A01C 5/06* | (2006.01) |
| *A01C 7/08* | (2006.01) |

(52) U.S. Cl.
CPC ............ *A01C 5/064* (2013.01); *A01B 63/008* (2013.01); *A01C 5/068* (2013.01); *A01C 7/08* (2013.01); *A01B 63/32* (2013.01)

(58) Field of Classification Search
CPC ....... A01B 63/008; A01B 63/32; A01C 5/064; A01C 5/068; A01C 7/08
See application file for complete search history.

(56) References Cited

U.S. PATENT DOCUMENTS

| | | | | |
|---|---|---|---|---|
| 2,577,775 A | * | 12/1951 | Lemmon ................ | A01C 5/068 |
| | | | | 111/164 |
| 2,691,353 A | * | 10/1954 | Secondo .................. | A01C 5/06 |
| | | | | 111/70 |
| 6,148,747 A | * | 11/2000 | Deckler ................. | A01C 7/203 |
| | | | | 111/164 |
| 6,295,938 B1 | * | 10/2001 | Stephan ................. | A01C 7/006 |
| | | | | 111/52 |
| 7,438,006 B2 | * | 10/2008 | Mariman ............... | A01C 5/064 |
| | | | | 111/164 |
| 9,192,088 B2 | * | 11/2015 | Bruce .................... | A01B 49/06 |
| 2011/0005439 A1 | * | 1/2011 | Patwardhan ........... | A01C 5/064 |
| | | | | 111/149 |
| 2014/0216771 A1 | * | 8/2014 | Bassett .................. | A01C 5/064 |
| | | | | 172/150 |
| 2014/0238283 A1 | * | 8/2014 | Wendte ................. | A01C 5/064 |
| | | | | 111/164 |
| 2015/0351311 A1 | * | 12/2015 | Johnson ................. | A01C 5/064 |
| | | | | 172/663 |
| 2017/0000002 A1 | * | 1/2017 | Anderson .............. | A01C 5/062 |

\* cited by examiner

*Primary Examiner* — Matthew R Buck
(74) *Attorney, Agent, or Firm* — McNees Wallace & Nurick

(57) ABSTRACT

An agricultural device including a frame, a pair of first rolling elements supported by the frame and configured to form a trench in a soil for planting a seed, and a pair of second rolling elements supported by the frame. The pair of second rolling elements cooperatively engage with the pair of first rolling elements to capture the soil caused by an operation of the pair of first rolling elements. The pair of first rolling elements is at a first angle and the pair of second rolling elements is at a second angle different than the first angle.

18 Claims, 14 Drawing Sheets

95

97

AGRICULTURAL DEVICE

FIELD OF DISCLOSURE

The present disclosure is generally directed to an agricultural device, and more particularly, directed to an agricultural device that is configured to directly seed with minimal soil disturbance.

BACKGROUND

No-till (also known as zero tillage or direct drilling) is an agricultural technique for growing crops or pasture without disturbing the soil through tillage. Recently, no-till farming has gained in popularity among conservationists and economically minded farmers as a solution to erosion, fuel consumption, irrigation, and fertilizer runoff. The no-till concept simply removes the step of tilling the crop stubble from a previous crop prior to planting the next successive crop. Instead, the next crop is planted directly in the crop stubble. The crop stubble is very effective in holding moisture within the soil regardless of terrain conditions. This moisture-holding characteristic also serves to hold beneficial fertilizer in place rather than allowing it to run off with excess water to pollute nearby water sources. Further, crop stubble slows wind movement adjacent to the ground surface and therefore reduces evaporation and insulates the ground against chill. Seed placed evenly at an optimum depth on firm soil and covered by a loose high humus soil requires less moisture to start growth. Further, the insulation quality of the crop stubble is conductive to early plant emergence and adds protection against winter damage.

The soil in a stubble field is ordinarily very hard and difficult to penetrate. For this reason, a seed drill is generally used which produces a substantial downward force against the drills in order to effectively penetrate the ground to a desired depth. As such, it has become desirable to produce a seed drill that will effectively penetrate such hardened ground and control the penetration in accordance with the terrain being planted.

In addition, with the increasing cost of seed, it is becoming increasingly desirable to utilize efficient seed planting equipment. Often seed drills include a form of metering device wherein spaced groups of seeds are allowed to fall from a seed dispensing chute to furrows formed in the ground. Although this procedure is serviceable, the individual seeds of each group are located too closely to one another within the furrow to enable proper growth of each individual seed.

Moreover, most seed drills push soil to be pushed out, i.e., blowout, causing the trench to open wider and possibly misaligning the seed placement in the soil. Also, the blowout material creates a disturbance of soil outside of the seeding area destroying the formed trenches.

In view of the problems associated with conventional seed drills, there remains a need to provide a seed drill that will control seeding depth and/or reduce blowout material caused by the seed drill.

SUMMARY

In an exemplary embodiment, an agricultural device including a frame, a pair of first rolling elements supported by the frame and configured to form a trench in a soil for planting a seed, and a pair of second rolling elements supported by the frame. The pair of second rolling elements cooperatively engage with the pair of first rolling elements to capture the soil caused by an operation of the pair of first rolling elements. The pair of first rolling elements is at a first angle and the pair of second rolling elements is at a second angle different than the first angle.

In another exemplary embodiment, an agricultural device including a frame, a pair of first rolling elements operatively connected to the frame for rotation about a first axis, and a pair of second rolling elements operatively connected to the frame for rotation about a second axis. The pair of second rolling elements is disposed rearwardly with respect to the pair of first rolling elements in a travel direction. The first pair of rolling elements is configured in a first angle inclination. The second pair of rolling elements is configured in a second angle inclination. The second angle inclination is different than the first angle of inclination.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION OF EXAMPLE EMBODIMENTS

This disclosure relates to no-till farming that requires no prior preparation of soil; otherwise known as direct seeding. To describe in a different manner, this disclosure relates to conservation farming, i.e., minimal soil disturbance, leaving a smooth top after seeding.

Due to the design of the present seed drill planting unit, depth control is very accurate because of the approximate proximity of rubber depth wheels in relation to disk opener blades. Further, the present seed drill planting unit can catch or trap blowout material, i.e., soil pushed to the side by the disk opener blades, for minimal soil disturbance. Moreover, the present seed drill planting unit is not sensitive to speed. That is, the speed of the seed drill planting unit moving has no effect on the control of seeding. Unlike conventional drill seeding units, these devices have no provisions to control blowout; thus the more speed, the more soil thrown away from planting area. In one implementation, rubber wheels are provided such that when soil continues to pass under the rubber wheels, it continues to push soil across a trench leaving minimal soil disturbance.

In an example implementation, the present seed drill planting unit includes a pair of disk opener blades that is angled with respect to each other, causing the soil to be pushed out each side, called blowout, which opens a trench to discharge the seed thereinto. Rubber wheels on each side catch the blowout material and pushes it down and into the trench, known as trench closing. This is done immediately after the seed is placed. Some advantages of the rubber wheels are, for example, catching the blowout material and returning the material to the seed trench, controlling seeding depth of the seed drill planting unit, and/or cleaning chunks (i.e., wipe) of soil off the disk blade to avoid soil from being thrown outside of the seeding area.

The present disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

Figure 2:
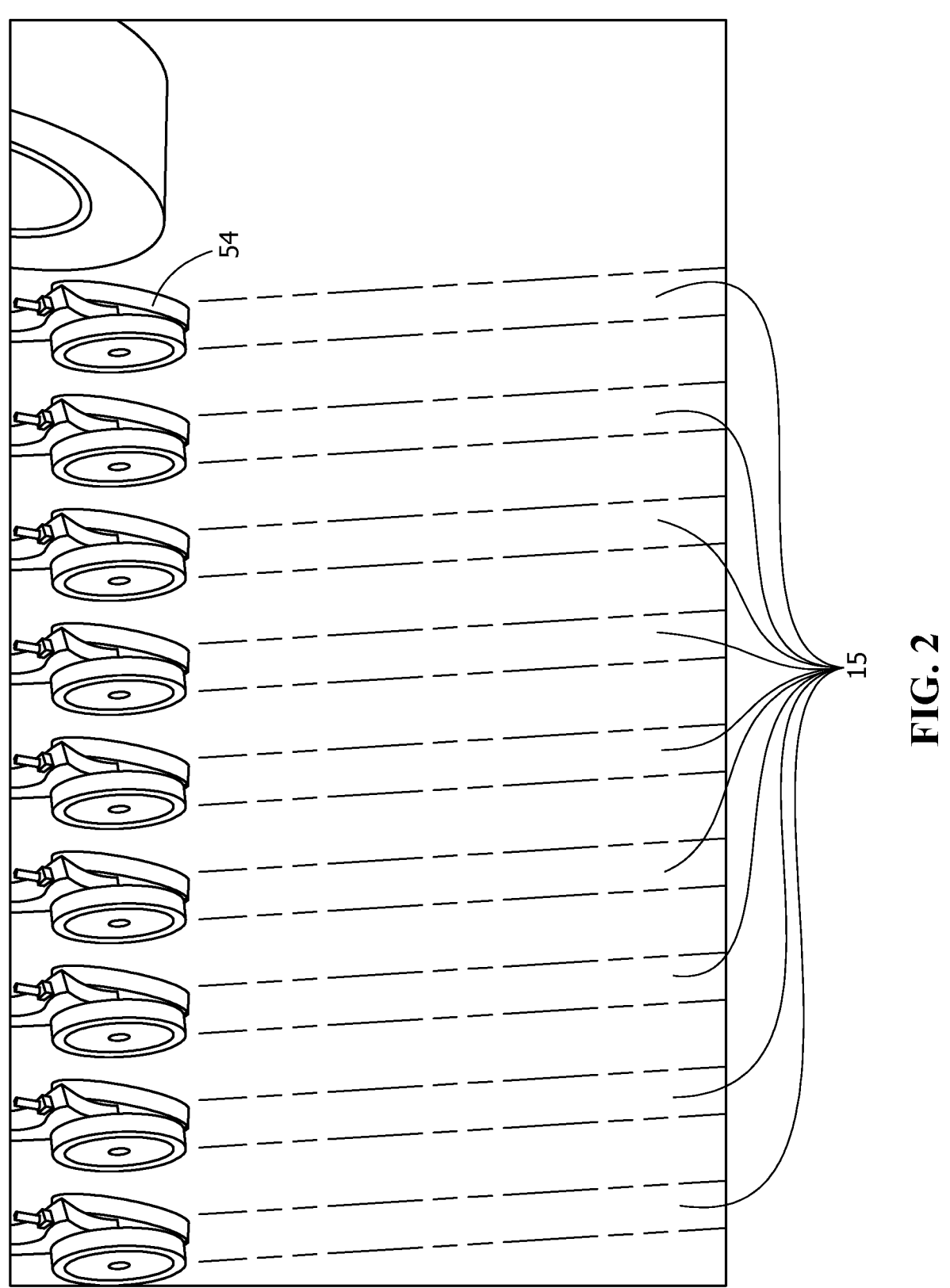
FIG. 2 shows a perspective view of a planting area according to an example embodiment of FIG. 1A.
Figure 3:
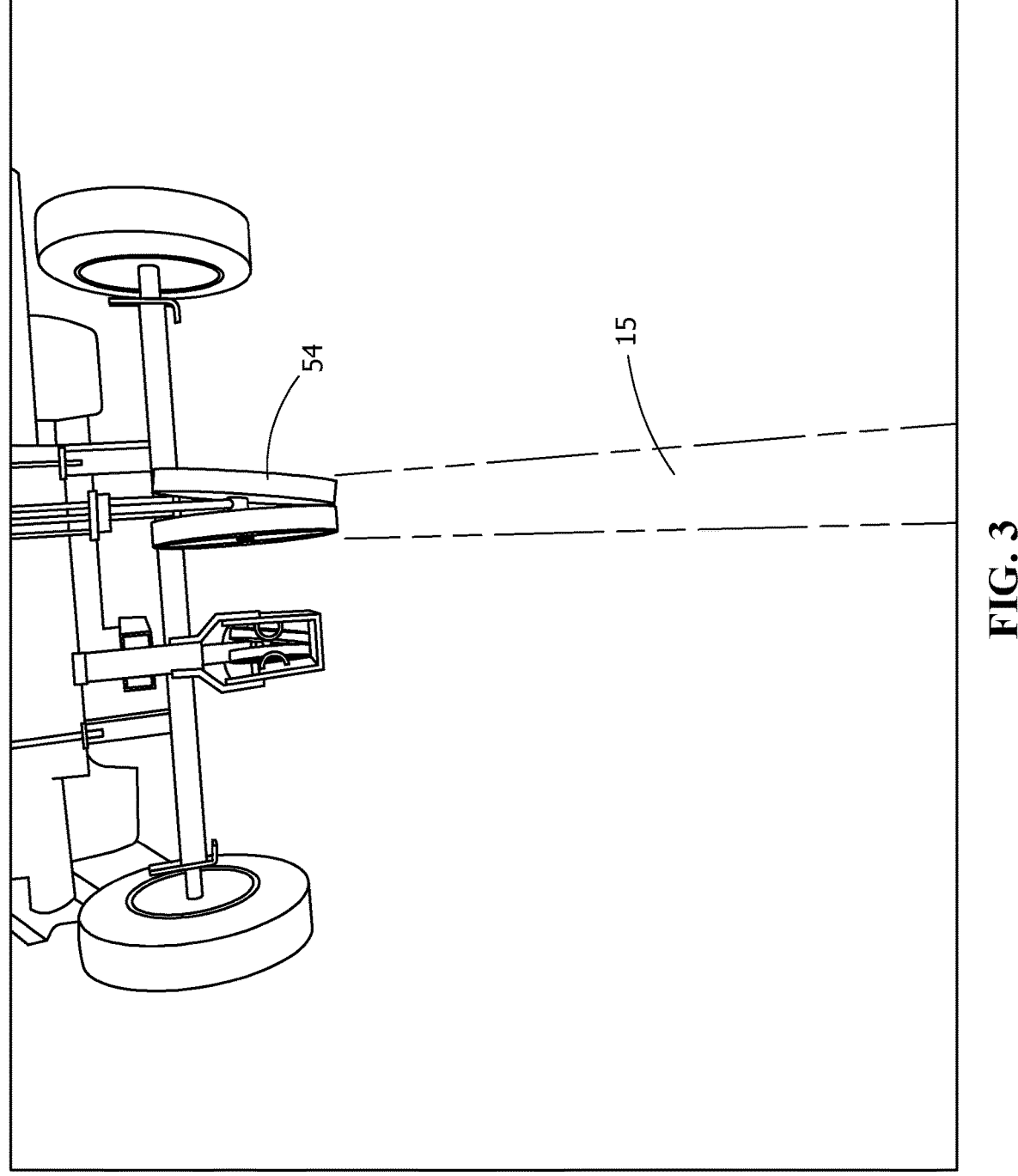
FIG. 3 shows a perspective view of a planting area according to another example embodiment of the present disclosure.

FIGS. 1A-1E illustrate an embodiment of an agricultural device such as an agricultural seed planter or seed drill 10 according to the present disclosure. Seed drill 10 includes a frame 12 carrying or supporting components associated with a seed planter such as a single seed planter (FIG. 3), or more typically, a plurality of modules or seed planters (FIG. 2). It should be appreciated that the frame 12 is not limited to a seed drill, and may be incorporated into a different agricultural implement or agricultural device or devices, such as a strip tilling machine, e.g., to crush cornstalks or other residue during the fall or other times of year for clearing a strip for the next crop, or use with other types of machines or applications. It is to be understood while other machines or apparatus may also be operatively connected to the agricultural device or to a vehicle, such as a tractor 11 or apparatus generally or specifically configured for use with the device, the other machines or apparatus may or may not be used in combination with the agricultural device.

Figure 1A:
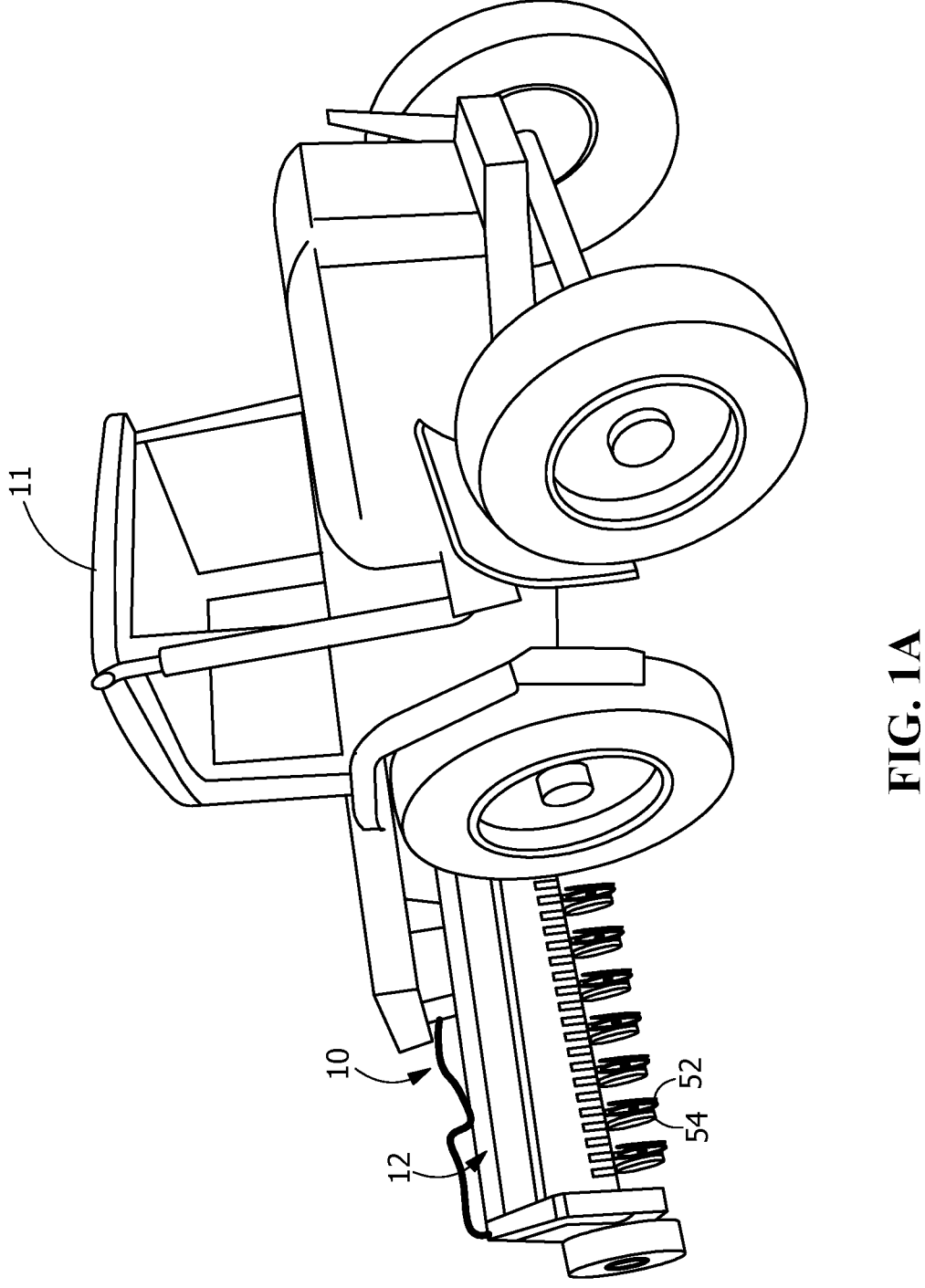
FIGS. 1A-1E show a perspective view of an agricultural device according to an example embodiment of the present disclosure.
Figure 1B:
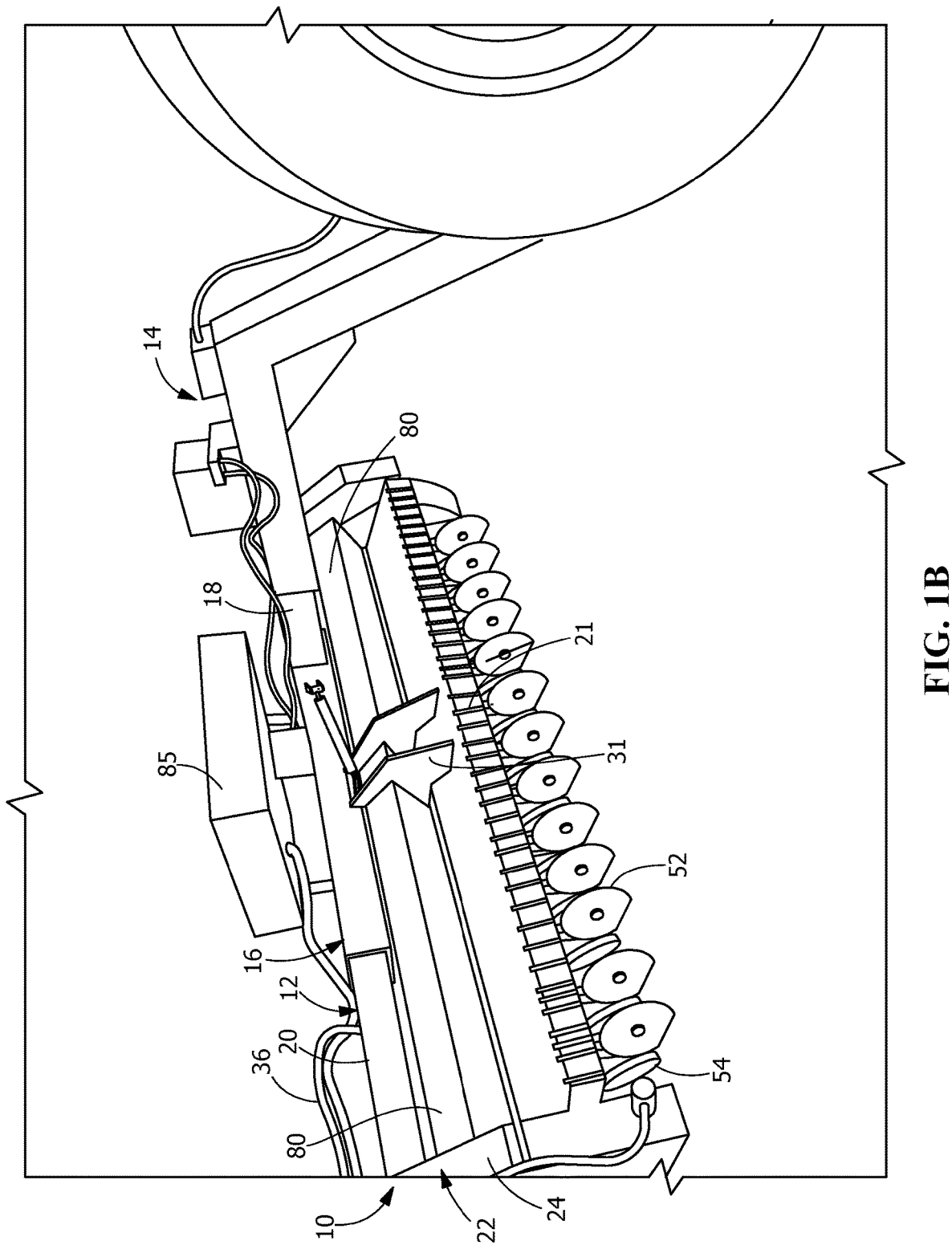
Figure 1C:
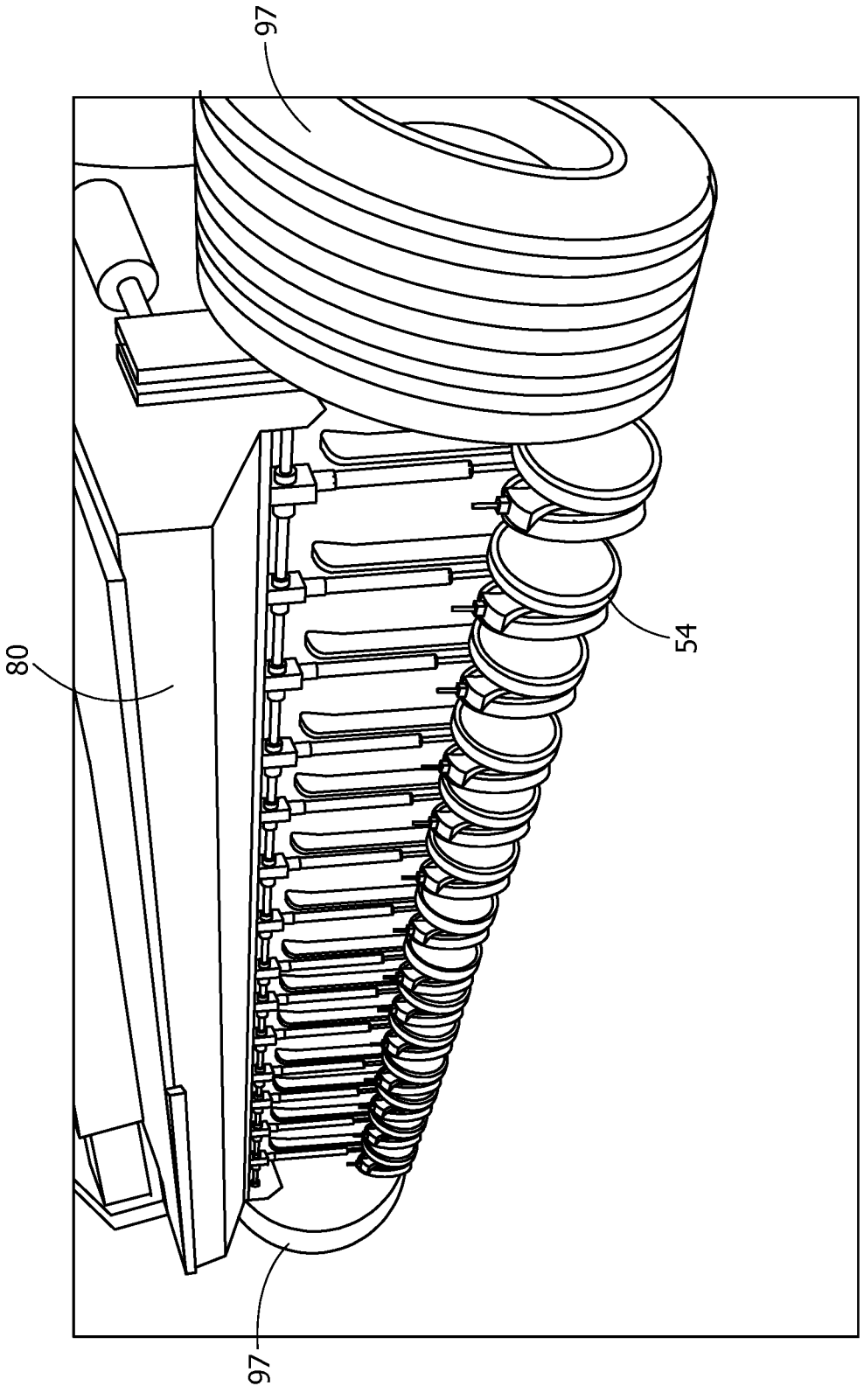

Referring to FIG. 1B, the frame 12 includes a frame portion 14 that carries or structurally supports a frame portion 16. In one implementation, the frame portion 14 is generally parallel (i.e., horizontal) with respect to the ground. At one end thereof, the frame portion 14 is secured to a hitch (not shown) of the towing vehicle or tractor 11. That is, the agricultural device 10 is operatively connected, i.e., towed by or otherwise secured to a vehicle, such as a tractor 11 or apparatus generally or specifically configured for use with the agricultural device, and may be used with another implement or application, or used without another implement. In other words, the agricultural device 10 may be operatively connected to either an implement or to a vehicle, although the agricultural device may be used by itself or in combination with another implement.

Figure 1D:
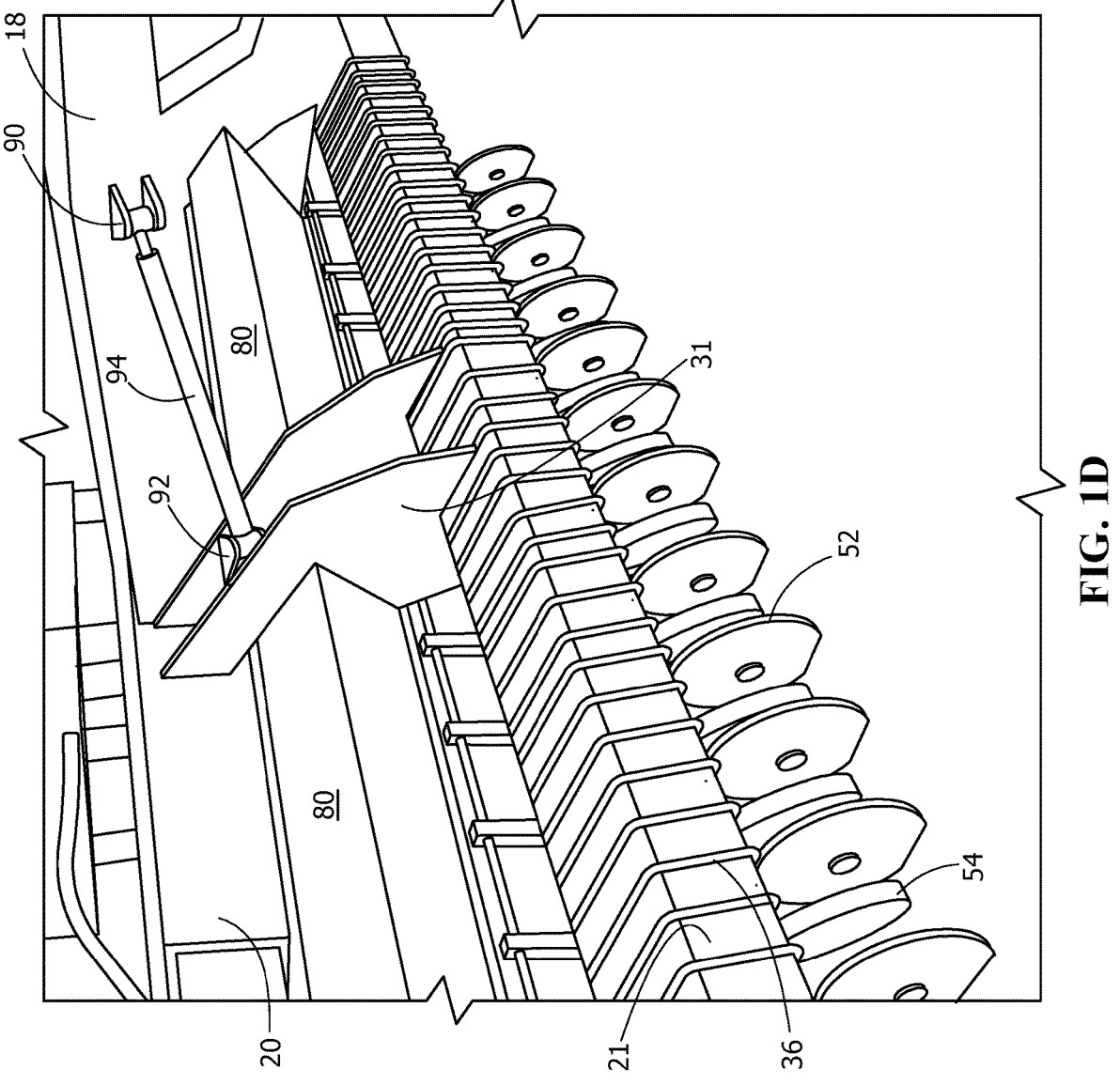
Figure 1E:
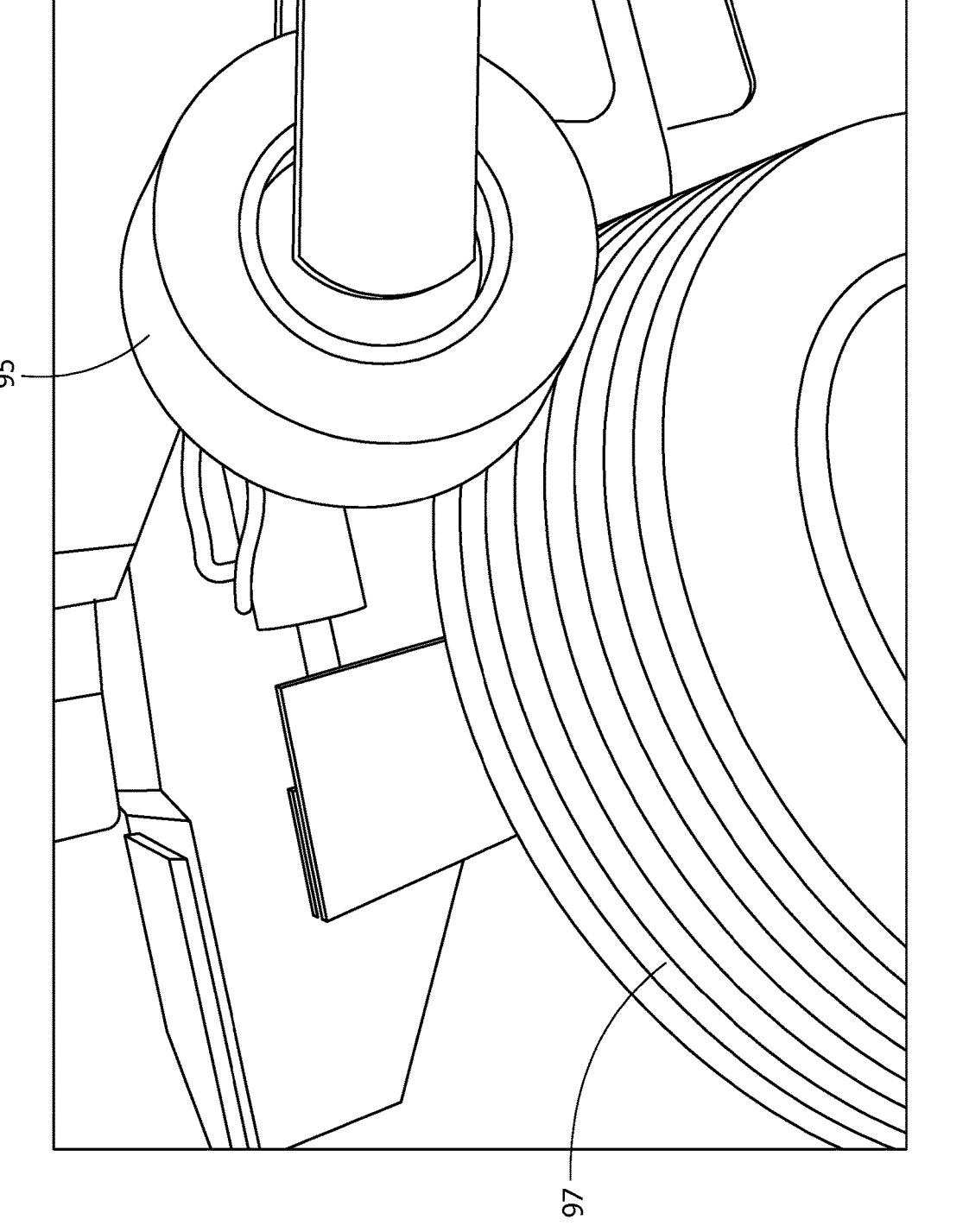

In some implementations, the frame portion 14 includes a tongue 18 that is secured to the towing vehicle or tractor 11. An end of tongue 18 opposite tractor 11 terminates at and is secured to a cross member or structural member 20, forming a T-shaped structure. As shown in FIG. 1D, the tongue 18 may further include a connection 90 for receiving one end of a hydraulic device 94 (or telescoping device), with the other end of the hydraulic device 94 received at a pivotable connection 92 formed in a structural member 31. The hydraulic device 94 delivers lateral adjustments of the tongue 18 with respect to the frame 12 for connection thereto.

Referring back to FIG. 1B, a structural member 21 extends parallel to and is secured to structural member 20, with structural members 20, 21 collectively forming a cap of the T-shaped structure formed with tongue 18 forming part of frame portion 14. The structural member 21 supports a plurality of rolling elements 52, 54, which will be described later in detail. Positioned between the structural members 20, 21 is a hopper 80 containing seeds to be displaced in the ground. The seeds may be discharged via a seed tube 13 which will also be discussed later in detail.

In some implementations, the frame portion 14 further includes a structural member 22 including legs 24, 26 that are secured to each other to form a substantially L-shaped structure. Stated another way, legs 24, 26 are attached to respective ends of structural members 20, 21. Attached near each leg 24, 26 is a wheel 95 that rotates on a surface of wheels 97, formed at each end of frame 12 (FIG. 1E), that rotatably supports a portion of frame 12 along a surface such as the ground. In other words, the wheel 95 contacts wheel 97, which is connected to a chain and drives the seed dispending meters (not shown). In some implementations, when the machine is lifted wheel 95 separates from wheel 97. The wheel 95 can act as a damping device to absorb bumps and for evaluating a terrain of the ground.

Figure 8:
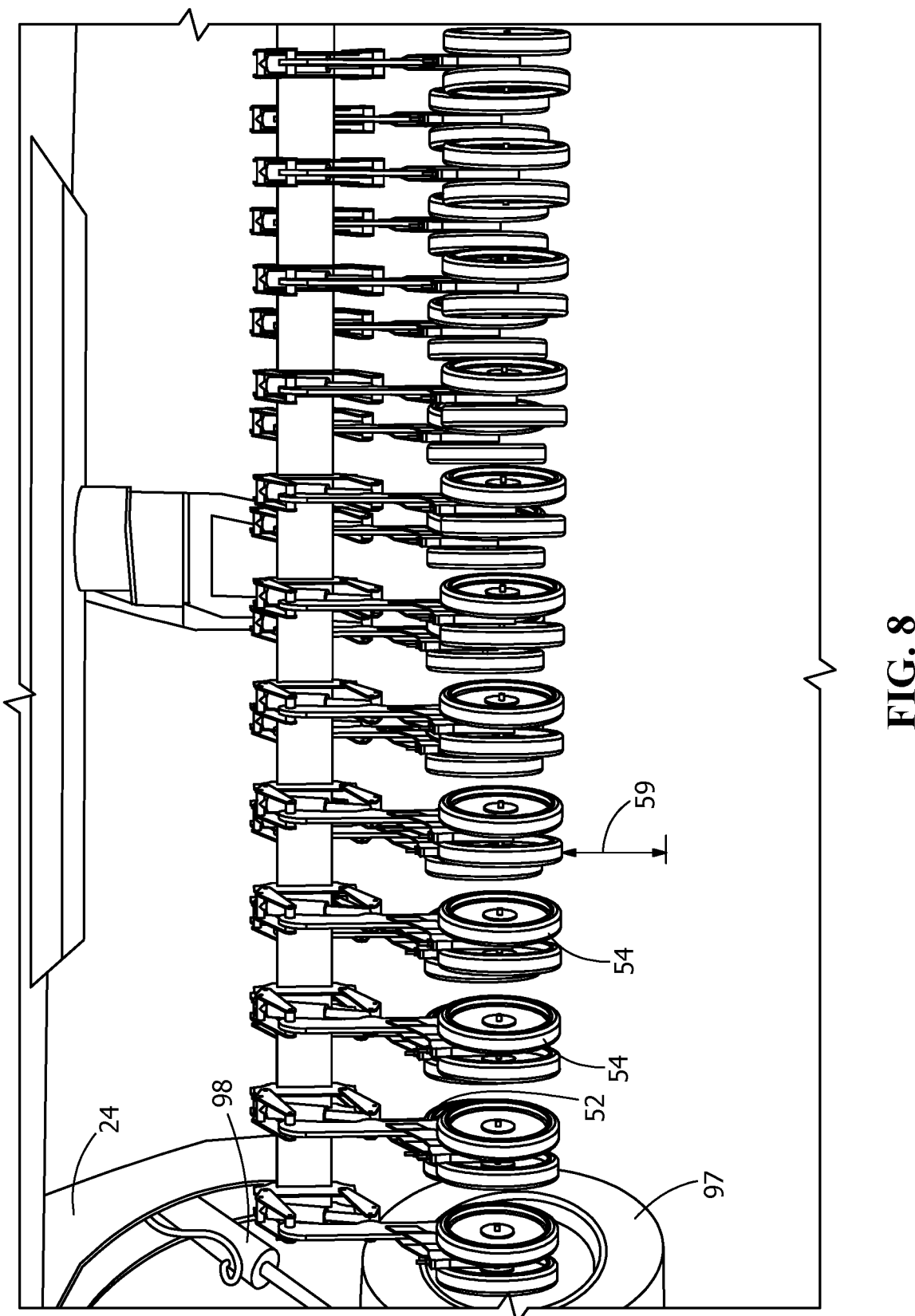
FIG. 8 shows a perspective view of a seed drill planting unit in a raised position according to an example embodiment of the present disclosure.
Figure 9:
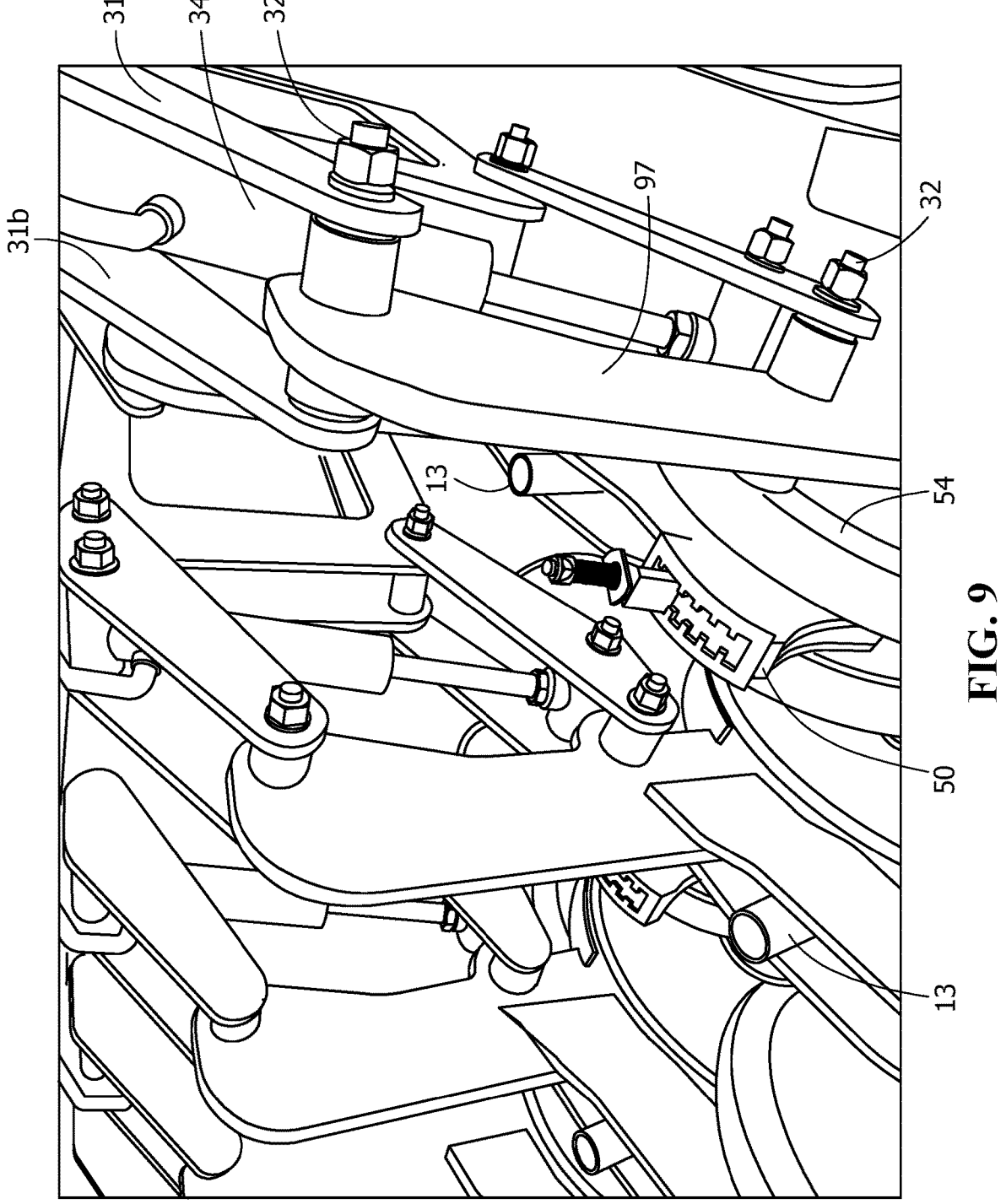
FIG. 9 shows a perspective view of a depth adjustment device according to an example embodiment of the present disclosure Wherever possible, the same reference numbers will be used throughout the drawings to represent the same parts. It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

In some implementations, as shown in FIG. 8, near each leg 24, 26 of structural member 22 includes a hydraulic device 98 that is attached to a pivotable connection at one end and a pivotable connection at the other end formed near the wheel 97. As a result of operable or pivotable connections between corresponding legs 24, 26, and the hydraulic device 98, in response to an actuation of hydraulic device 98 as a result of flow of fluid to the hydraulic device 98 from a fluid source (not shown) via interconnected fluid lines 36 such that a distance between opposed ends of hydraulic device 98 is increased, a vertical position of the pivotable connection at leg 24 is raised relative to the ground. The position of the pivotable connection at leg 24 corresponds with one end of structural member 22. In other words, as the pivotable connection at leg 24 is raised, the structural members 20, 21 of frame portion 16 is similarly raised which includes the rolling elements 52, 54. Stated another way, frame portion 14 is adapted to raise frame portion 16, as indicated by distance 59, in relation to the ground. Conversely, in response to the actuation of hydraulic device 98 as a result of flow of fluid to the hydraulic device 98 from a fluid source (not shown) via interconnected fluid lines 36 such that the distance between opposed ends of hydraulic device 98 is decreased, the vertical position of pivotable connection at leg 24 is lowered relative to the ground. The position of pivotable connection at leg 24 corresponds with one end of structural member 22. In other words, as pivotable connection at leg 24 is lowered, structural members 20, 21 of frame portion 16 are similarly lowered which includes the rolling elements 52, 54. Stated another way, frame portion 14 is adapted to lower frame portion 16 to allow the rolling elements 52, 54 to touch the ground. It is to be understood that other linkage configurations could also be used to achieve similar motions concerning the frame components. Accordingly, the frame 12 of the seed drill planter 10 of the present disclosure may be transitioned from a planting position (FIG. 1B) to a raised position (FIG. 8), It is understood by those skilled in the art that the sequence of positions identified from the raised is simply reversed to return the planter to planting position.

In some implementations, at a top of frame portion 16, a housing 85 that contains various components, such as, for example, controllers, microprocessors, fluids for hydraulic devices, etc., is mounted thereon.

Figure 4A:
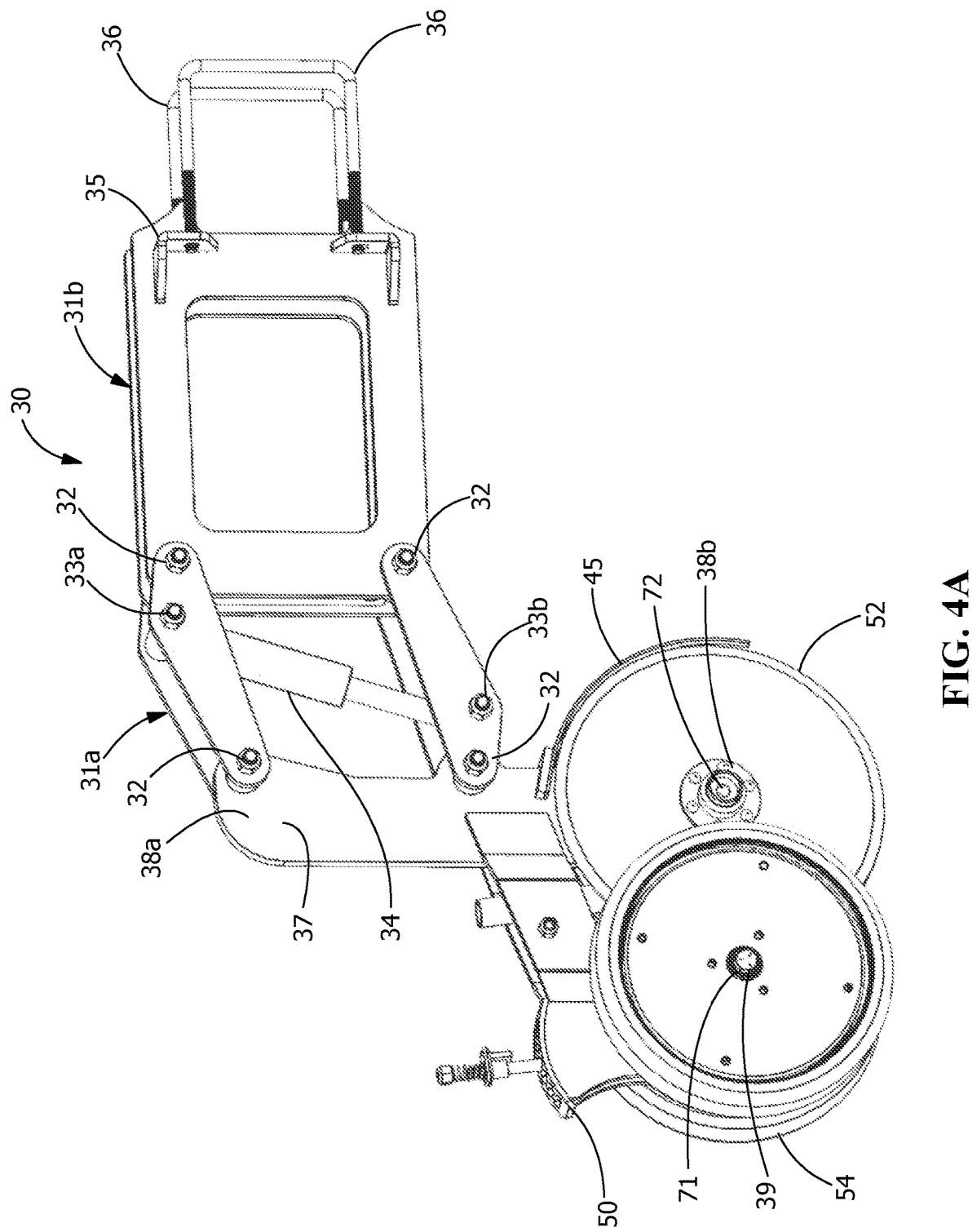
FIG. 4A shows a perspective view of a support frame of a seed drill planting unit according to an example embodiment of the present disclosure.
Figure 4B:
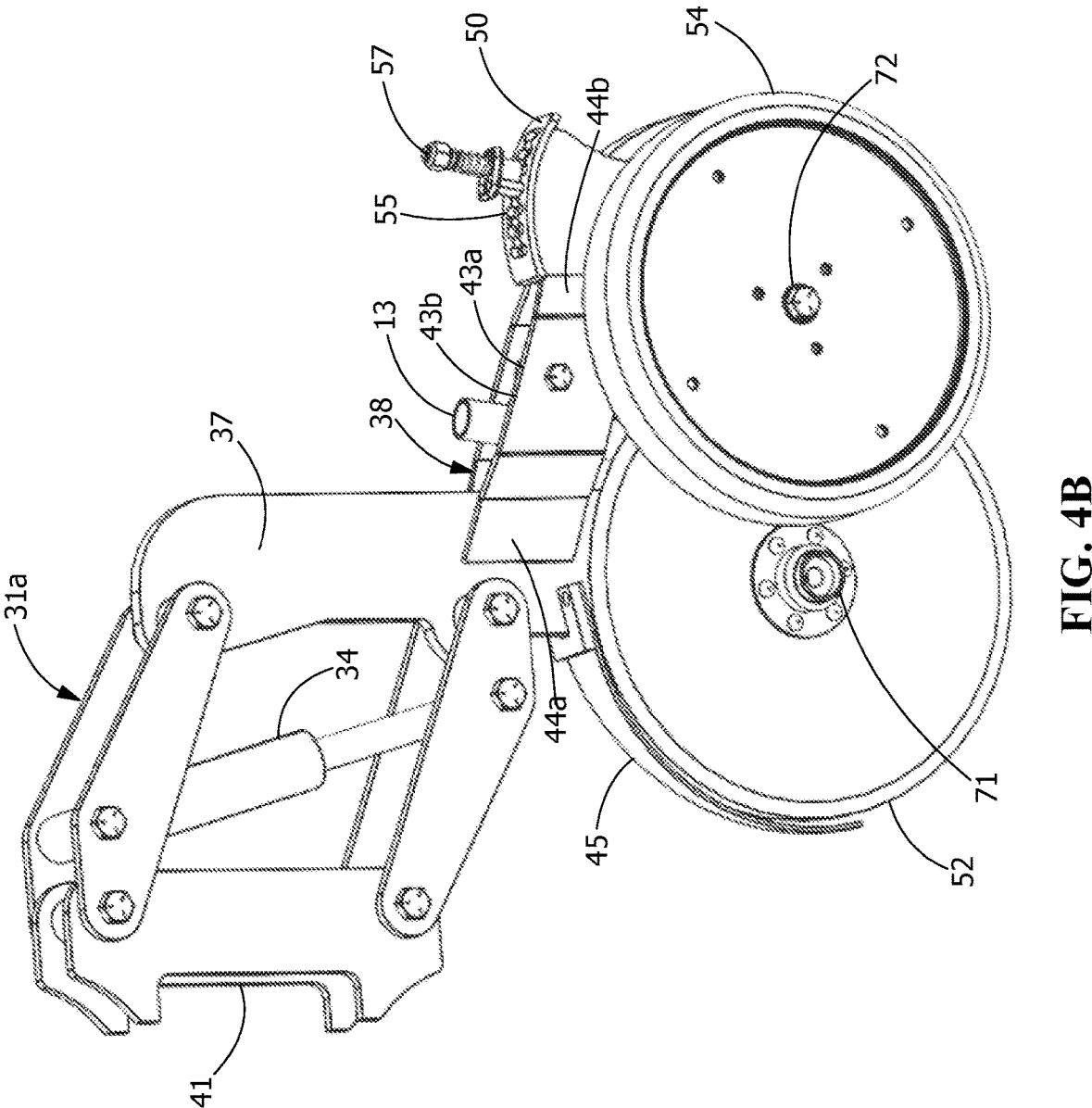
FIG. 4B shows a perspective view of a support frame of a seed drill planting unit according to another example embodiment of the present disclosure.

Referring now to FIGS. 4A and 4B, a support frame 30 includes a first frame portion 31*a* and a second frame portion 31*b* for supporting the roller elements 52, 54. The first frame portion 31*a* and the second frame portion 31*b* are pivotally connectable via connection elements 32. In other words, the first and second frame portions 31*a*, 31*b* can move with respect to the ground. In other implementations, the first and second frame portions 31*a*, 31*b* can move with respect to each other.

In some implementations, the first frame portion 31*a* includes a pivotable connection 33*a* for receiving one end of a hydraulic device 34 with the other end of the hydraulic device 34 received at a pivotable connection 33*b* formed in the first frame portion 31*a*. The hydraulic device 34 provides a vertical movement of the supporting frame 30 with respect to the frame 12 and/or the ground. In one implementation, the supporting frame 30 may move vertically up to 10 inches via the hydraulic device 34.

At an end 35 of the second frame portion 31*b*, a pair of attachment members 36 extends therefrom for attachment to the frame 12. More specifically, the pair of attachment members 36 can be attached to the structural member 21 of frame 12. In one implementation, the pair of attachment members 36 is configured as a U-bolt that can be secured around the structural member 21, as shown in FIG. 1D.

In an alternative embodiment, the support frame 30 can be configured as a shorten device where the second frame portion 31*b* is not provided (FIG. 4B). As such, end portion 41 of the first frame portion 31*a* is directly attached to a portion of the frame 12. In this case, a distance from the rolling elements 52, 54 is closer to the frame 12 as compared to when the second frame portion 31*b* is provided. In one implementation, a length of the second frame portion 31*b* can be 14 inches long, for example, hence, a length of the entire support frame 30 is reduced.

The support frame 30 further includes a vertical frame member 37 and a horizontal frame member 38. The vertical frame member 37 is attached to the first frame portion 31*a* at one end 38*a* and at a mid-portion of the vertical frame member. The other end 38*b* of the vertical frame member 37 is attached to the rolling elements 52 for supporting the rolling elements 52. The vertical frame member 37 is pivotally connected to the first frame portion 31*a* via the connection elements 32. The rolling elements 52 rotates about an axis 72 connected to end 38*b*.

The horizontal frame member 38 is attached to the vertical frame member 37 which is adapted to support a seed feed tube 13 and the rolling members 54. In one implementation, the horizontal frame member 38 is attached near a mid-portion of the vertical frame member 37 in a substantially perpendicular direction. The horizontal frame member 38 can be attached to the vertical frame member 37 via welding, for example. It should be appreciated that other attachment methods may be employed such as, but not limited to, mechanical fasteners, i.e., screws, nuts and bolts, anchors, rivets, etc. The rolling elements 54 rotates about an axis 71 connected at connection 39.

As shown in FIG. 4B, the horizontal frame member 38 includes a pair of planar members 43*a*, 43*b* that surrounds the seed feed tube 13 where each end 44*a* of the planar members 43*a*, 44*b* is attached to the vertical frame member 37. The other end 44*b* of each planar member 43*a*, 44*b* is attached to a wheel depth adjustment portion 50. The wheel depth adjustment portion 50 is configured to set the depth of the rolling elements or wheels 54 that forms a depth of the trench 15 for planting seeds. In one implementation, the wheel depth adjustment portion 50 can set a height of the rolling elements 54 having a range up to 2¾ inches. The wheel depth adjustment portion 50 further includes a plurality of openings (or slots) 55 for receiving an adjustment handle member 57 that can move to various positions for adjustment of the wheel depth. In other words, the plurality of openings 55 permits the adjustment handle member 57 to slidably engage and position the adjustment handle member 57 therein. In one implementation, the wheel depth adjustment portion 50 includes 7 openings 55 corresponding to 12 different settings each configured to move the wheel having a planting depth ranging from ¼" to 2½" deep. In one implementation, the adjustment handle member 57 can be rotated 180 degrees to split the 7 adjustments minus 1 for each end. In some implementations, the wheel depth adjustment portion 50 further includes a depth adjustment member 58 (FIG. 5) embodied mostly inside of the wheel depth adjustment portion 50 that cooperatively engage with a pivoting arm wheel mount 59 for adjusting the height of the rolling members 54. In use, when the depth adjustment member 58 exerts a downward force, the pivoting arm wheel mount 59 correspondingly moves in a downward force to set the depth of the pair of rolling members 54.

Figure 5:
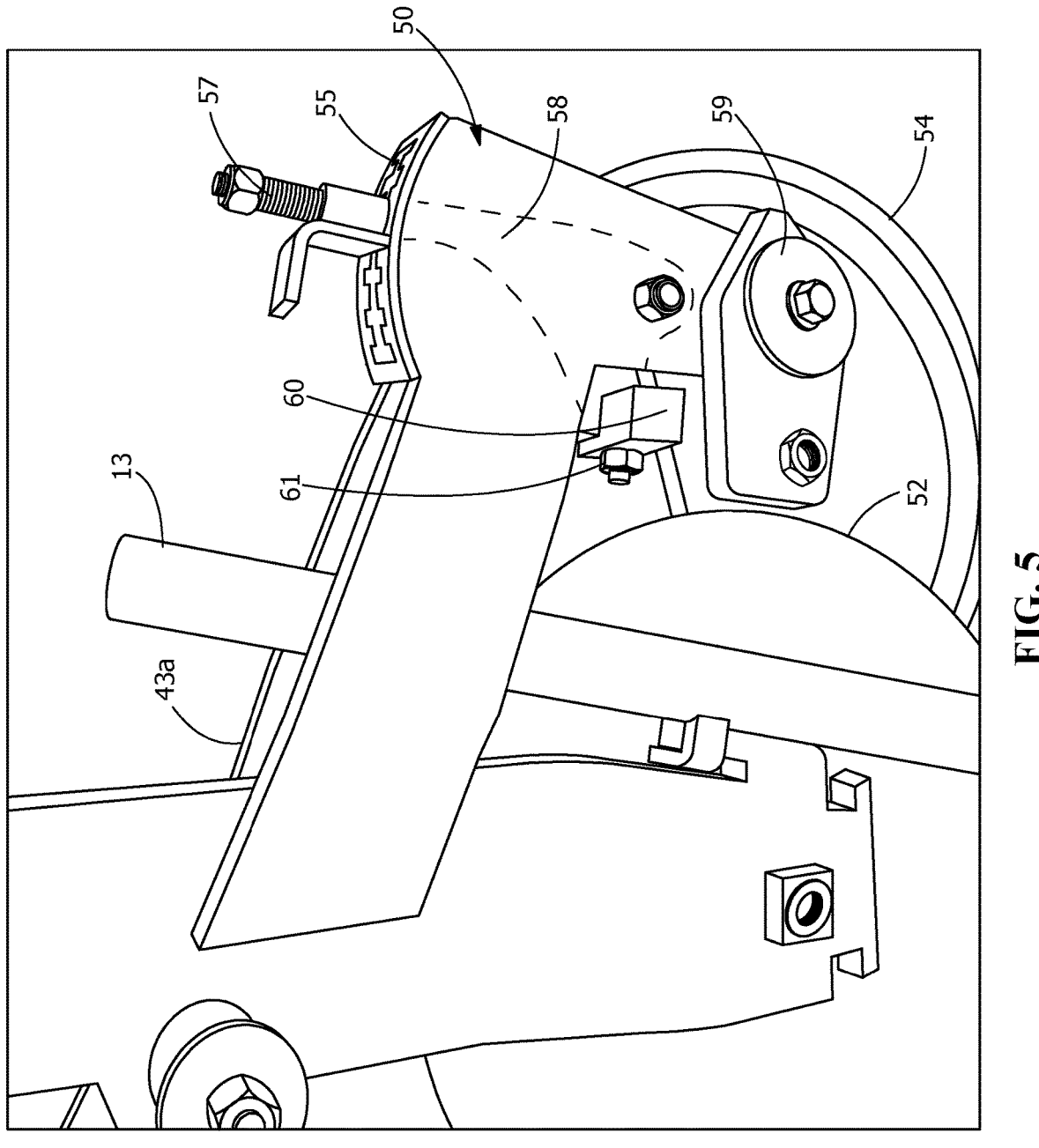
FIG. 5 shows a perspective view of a depth adjustment device according to an example embodiment of the present disclosure.
Figure 6:
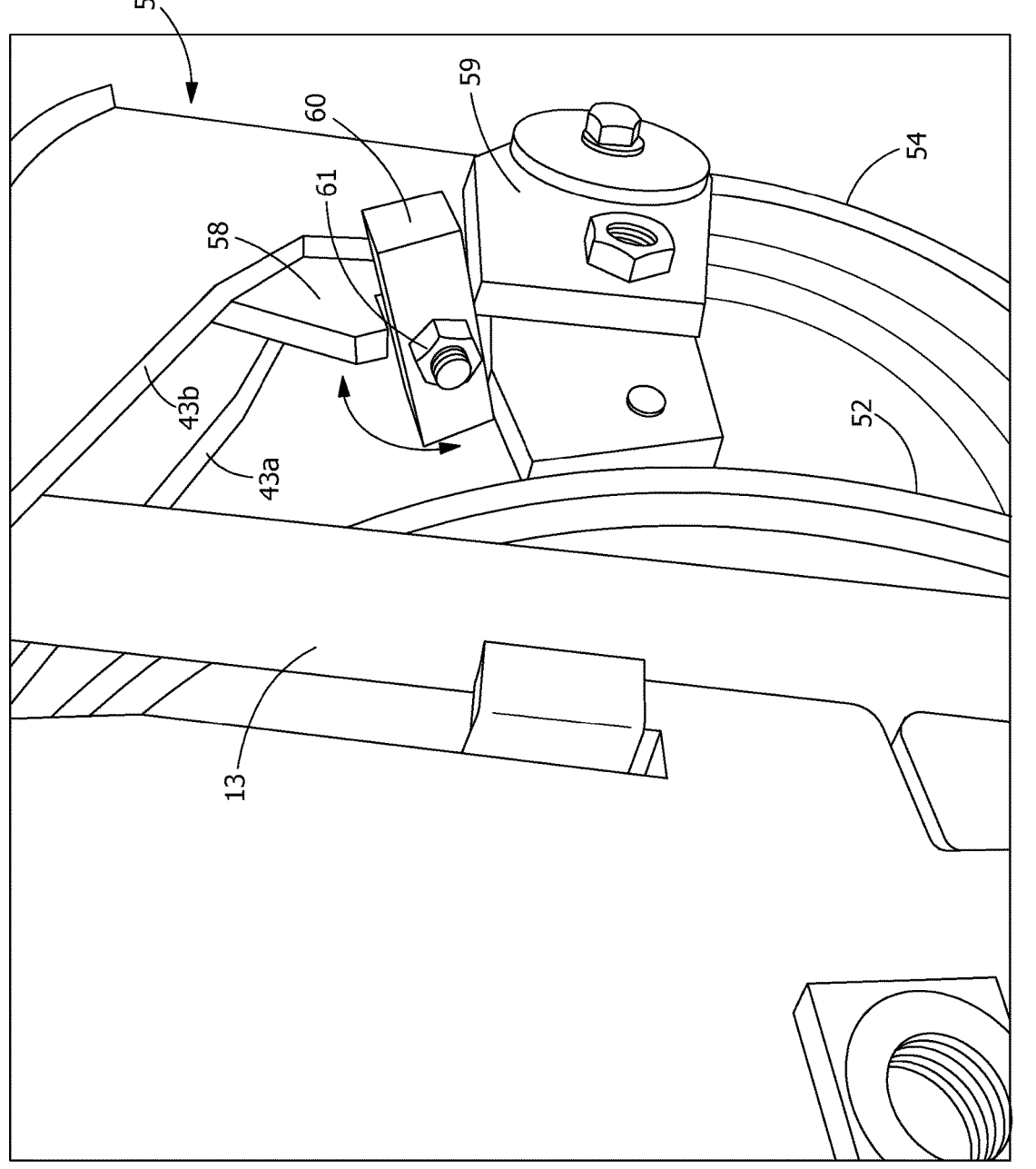
FIG. 6 shows a perspective view of the depth adjustment device according to an example embodiment of FIG. 5.

In order to maintain the depth distance at a constant distance, an equalizer 60 (FIG. 5) is provided between the depth adjustment member 58 and the pivoting arm wheel mount 59. The equalizer 60 can be mounted to the wheel depth adjustment portion 50 via a fastener 61, for example, but not limited to, bolt and nut. The equalizer 60 has a tandem pivot (i.e., pivotably moves back and forth) to equalize between the rolling elements 54 while moving across the terrain of the ground (FIG. 6). That is, the equalizer 60 assists maintaining the constant depth of the rolling elements 54 while moving across uneven terrain. In one implementation, the equalizer 60 has a tolerance (movement) of up to approximately ½ inch between the depth adjustment member 58 and the pivoting arm wheel mount 59. It is noted that FIG. 5 depicts the removal of one of the pair of rolling elements 52, 53 in order to illustrate the equalizer 60 in detail, which is positioned between the pair of rolling elements 54.

Figure 7:
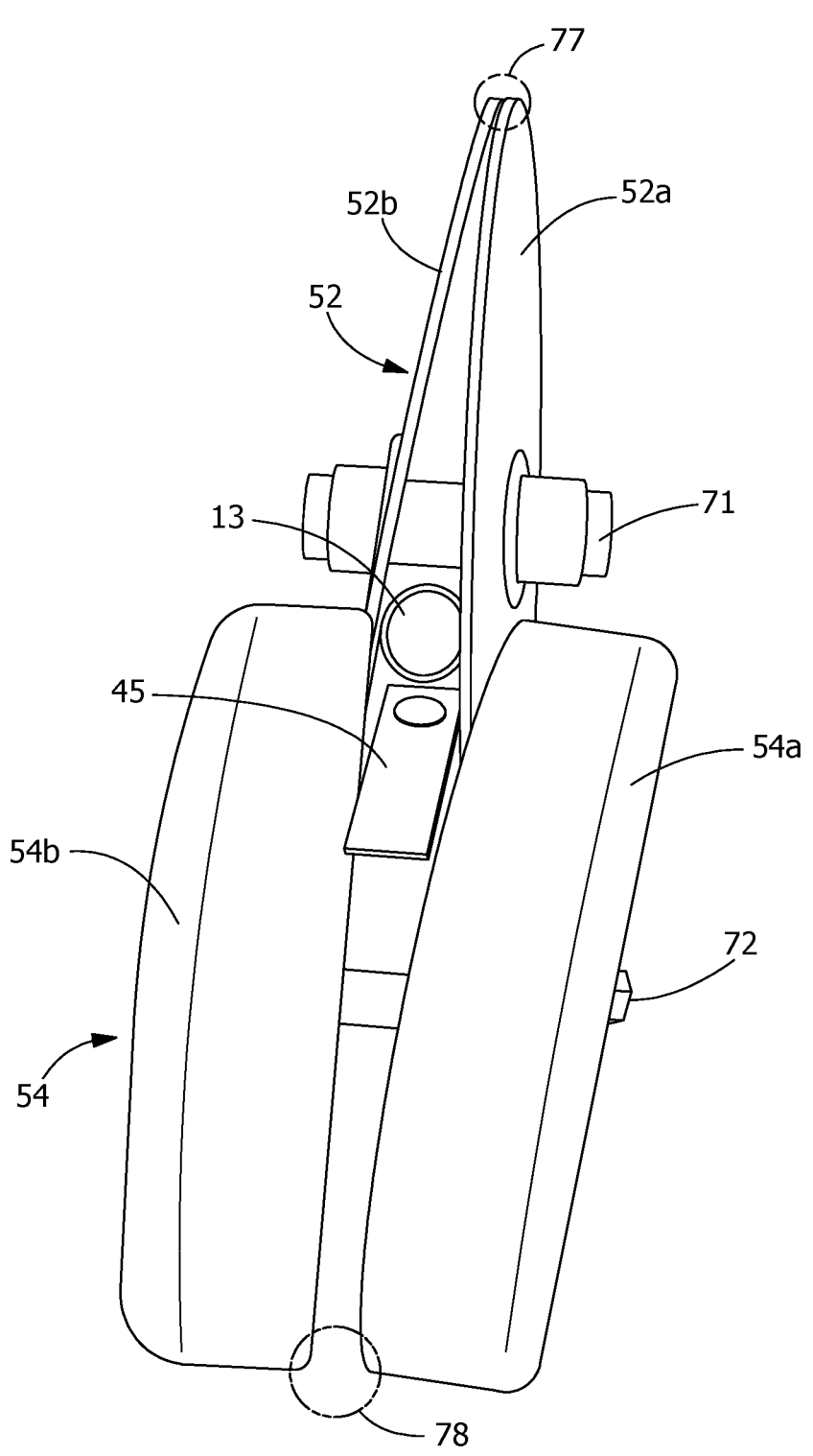
FIG. 7 shows a perspective bottom view of rolling members according to an example embodiment of the present disclosure.

Referring now to FIG. 7, the rolling members 52 includes a first disc blade 52a and a second disc blade 52b co-axially aligned at axis 71 that are configured to disrupt (break up or loosen) the soil for planting seed, called direct seeding. That is, due to the configuration of the first disc blade 52a and the second disc blade 52b with respect to each other, this causes the soil to be pushed out towards the side of the respective disc blades 52a, 52b, i.e., blowout material. More specifically, the first and second disc blades 52a, 52b face each other at an angle (non-parallel) causing the soil to break up when the tractor 11 drives across the planting area. That is, one of the disc blades has a positive camber angle and the other disc blade has a negative camber angle. For example, disc blade 52a has a positive camber angle and disc blade 52b has a negative camber angle, each disc angle having an equal amount of caster. Stated in another way, the first and second disc blades 52a, 52b has an angle of inclination, in which this angle of inclination is sufficient along with the location of the first and second disc blades 52a. 52b to cause the discs to meet a point of convergence 77 at a forward direction. The angular relationship of the disc blades 52a, 52b leaves a larger space located near the seed tube 13. In some implementations, each of the first and second disc blades 52a, 52b can be made from a metal material that is corrosion resistant or rust-free, such as, for example, stainless steel, aluminum metal, copper, bronze, brass, or galvanized steel.

In some implementations, a seed deflection member 45 is provided to cover a portion of the first and second disc blades 52a, 52b. The seed deflection member 45 can prevent the seed discharged from the seed feed tube 13 from flying away from the seeding area. In one implementation, the seed deflection member 45 is made from a material that conforms to the shape of the seed trench. For example, the seed deflection member 45 can be made from various materials, such as, metal or flexible material.

The rolling members 54 includes a first rubber wheel 54a and a second rubber wheel 54b co-axially aligned at axis 72 that are configured to catch blowout material and push the soil down and into the formed trench, known as trench closing. As shown in FIG. 7, the first and second rubber wheels 54a, 54b surround or cover a portion of the respective first and second disc blades 52a, 52b to catch the blowout material caused by the disc blades 52a, 52b. This is allowed by the rubber wheels 54a, 54b contacting a side portion of disc blades 52a, 52b, which cleans chunks of gathered soil off the disc blades 52a, 52b, to avoid soil from being thrown outside of the seeding area. The rubber wheels 54a, 54b also catch the blowout material and return the material towards the trench 15, as shown in FIG. 2. This is in stark contrast to conventional seed drills where blowout material is provided (i.e., pushed to the side of each disc blade causing the trench to be exposed). In addition, the rubber wheels 54a, 54b control the seeding depth of the planting unit via the depth adjustment device 50 being fixated. This enables consistent direct seeding and leaves a smooth top after seeding.

In some implementations, the rubber wheels 54a, 54b are also at an angle due to the angle inclination of the disc blades 52a, 52b. In this case, the camber angles of the rubber wheels 54a, 54b are at the same angle as the disc blades 52a, 52b. Stated another way, the angle inclination of the rubber wheels 54a, 54b are at an opposite configuration in relation to the angle inclination of the disc blades 52a, 52b. Thus, the rubber wheels 54a, 54b meet a point of convergence 78, opposite the point of convergence 77 of the disc blades 52a, 52b. That is, each of the point of convergences 77, 78 is farthest from the seed feed tube 13 as viewed in FIG. 7. Stated another way, similar to the disc blades 52a, 52b, one of the rubber wheels has a positive camber angle and the other rubber wheel has a negative camber angle. For example, rubber wheel 54a has a negative camber angle and rubber wheel 54b has a positive camber angle, which are the same as the camber angles of the disc blades 52a, 52b, i.e., the rubber wheels 54a, 54b also have a caster angle opposite of a caster angle of the disc blades 52a 52b.

Further, because of the design of the present seed drill, depth control is very accurate due to closeness of the rubber depth wheels 54a, 54b in relation to disk opener blades 52a, 52b. Moreover, because the rubber wheels 54a, 54b allows catching of blowout material, the present seed drill is not sensitive to speed. In stark contrast to conventional drill seeding units, which have no provisions to control blowout, faster moving vehicle 11 will throw more soil, i.e., soil disturbance, away from the planting area. Hence, due to the caster action on the rubber wheels 54a, 54b, as soil continues to pass under, the rubber wheels 54a, 54b continue to push soil across the trench 15 leaving minimal soil disturbance.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/ combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An agricultural device, comprising:

a frame;

a pair of first rolling elements supported by the frame and configured to form a trench in a soil for planting a seed;

a pair of second rolling elements supported by the frame, wherein the pair of second rolling elements cooperatively engage with the pair of first rolling elements to capture the soil caused by an operation of the pair of first rolling elements, wherein a side portion of the pair of second rolling elements is in direct contact with a side portion of the pair of first rolling elements, wherein the pair of first rolling elements face each other at a first angle providing a first point of convergence that is positioned along a travel direction, wherein the pair of second rolling elements face each other at a second angle providing a second point of convergence that is positioned along the travel direction, and wherein the second point of convergence is positioned opposite to the first point of convergence;

a depth adjustment device configured to set a depth of the pair of second rolling elements that forms a depth of a trench for planting the seed, wherein the depth adjustment device includes a plurality of openings for receiving an adjustment handle member that can move to various positions for adjustment of the depth of the pair of second rolling elements.

2. The device of claim 1, wherein the pair of first rolling elements is a disc blade for loosening the soil.

3. The device of claim 2, wherein the disc blade is made from a metal material.

4. The device of claim 1, wherein the pair of second rolling elements is made from a rubber material.

5. The device of claim 1, wherein the pair of second rolling elements partially surrounds the pair of first rolling elements.

6. The device of claim 1, wherein the frame includes a first frame portion and a second frame portion, wherein the first frame portion and the second frame portion are pivotably connectable to each other.

7. The device of claim 6, wherein the first frame portion includes a pivotable connection for receiving one end of a telescoping device with the other end of the telescoping device received at a pivotable connection formed in the first frame portion, wherein the telescoping device is configured to provide a vertical movement of the frame.

8. The device of claim 6, wherein the frame further includes a vertical frame member and a horizontal frame member, wherein the vertical frame member is attached to the first frame portion at one end and at a mid-portion of the vertical frame member, wherein the other end of the vertical frame member is attached to the first pair of rolling elements for supporting the first pair of rolling elements.

9. The device of claim 8, wherein the vertical frame member is pivotally connected to the first frame portion via connection elements.

10. The device of claim 8, wherein the horizontal frame member is attached to the vertical frame member which is adapted to support a seed feed tube, wherein the horizontal frame member includes a pair of planar members that surrounds the seed feed tube where each end of the planar members is attached to the vertical frame member.

11. The device of claim 1, further comprising an equalizer provided between the depth adjustment device and a pivoting arm wheel mount, wherein the equalizer is configured to tandemly pivot to stabilize the depth adjustment device.

12. The device of claim 1, further comprising a seed deflection member configured to cover a portion of the first pair of rolling elements, wherein the seed deflection member is configured to prevent a seed discharged from a seed feed tube from flying away from a seeding area.

13. An agricultural device, comprising:

a frame;

a pair of first rolling elements operatively connected to the frame for rotation about a first axis; and a pair of second rolling elements operatively connected to the frame for rotation about a second axis, the pair of second rolling elements disposed rearwardly with respect to the pair of first rolling elements in a travel direction, wherein the first pair of rolling elements is configured in a first angle inclination by facing the first pair of rolling elements to face each other at a first convergence point, wherein the second pair of rolling elements is configured in a second angle inclination by facing the second pair of rolling element to face each other at a second convergence point, wherein the first convergence point and the second convergence point are positioned parallel with respect to each other and in the same direction as the travel direction, wherein the frame includes a first frame portion and a second frame portion, the first frame portion and the second frame portion being pivotably connectable to each other, and wherein the frame further includes a vertical frame member and a horizontal frame member, wherein the vertical frame member is attached to the first frame portion at one end and at a mid-portion of the vertical frame member, wherein the other end of the vertical frame member is attached to the first pair of rolling elements for supporting the first pair of rolling elements.

14. The device of claim 13, wherein the pair of first rolling elements is a disc blade for loosening the soil.

15. The device of claim 13, wherein the pair of second rolling elements is a rubber wheel.

16. The device of claim 13, wherein the pair of second rolling elements is in direct contact with the pair of first rolling elements.

17. The device of claim 13, wherein the pair of second rolling elements is in direct contact at a side portion of the pair of first rolling elements.

18. An agricultural device, comprising:

a frame;

a pair of first rolling elements supported by the frame and configured to form a trench in a soil for planting a seed;

a pair of second rolling elements supported by the frame, wherein the pair of second rolling elements cooperatively engage with the pair of first rolling elements to capture the soil caused by an operation of the pair of first rolling elements, wherein a side portion of the pair of second rolling elements is in direct contact with a side portion of the pair of first rolling elements, wherein the pair of first rolling elements face each other at a first angle providing a first point of convergence that is positioned along a travel direction, wherein the pair of second rolling elements face each other at a second angle providing a second point of convergence that is positioned along the travel direction, and wherein the second point of convergence is positioned opposite to the first point of convergence, wherein the frame includes a first frame portion and a second frame portion, wherein the first frame portion and the second frame portion are pivotably connectable to each other, wherein the first frame portion includes a pivotable connection for receiving one end of a telescoping device with the other end of the telescoping device received at a pivotable connection formed in the first frame portion, wherein the telescoping device is configured to provide a vertical movement of the frame.

* * * * *